United States Patent [19]

Gillis

[11] 3,866,000

[45] Feb. 11, 1975

[54] TELEPHONE LOCK KIT

[76] Inventor: Richard D. Gillis, 23627 Anza Ave., Apt. B, Torrance, Calif. 90505

[22] Filed: Apr. 27, 1973

[21] Appl. No.: 354,989

[52] U.S. Cl. .............................................. 179/189 D
[51] Int. Cl. .............................................. H04m 1/66
[58] Field of Search ............ 179/189 R, 189 D, 179, 179/178, 100 D, 100 R

[56] References Cited

UNITED STATES PATENTS

| | | | |
|---|---|---|---|
| 1,717,147 | 6/1929 | Daily | 179/189 D |
| 2,000,669 | 5/1935 | Poliakoff | 179/189 D |
| 3,395,257 | 7/1968 | Clark et al. | 179/100 D |
| 3,480,743 | 11/1969 | Engh et al. | 179/178 |

*Primary Examiner*—Thomas W. Brown
*Attorney, Agent, or Firm*—Paul A. Weilein

[57] ABSTRACT

The kit is for use on a telephone wherein a number mechanism of the telephone has an array of manually operable number elements and the housing encloses the number mechanism with said array positioned at a window opening of the housing. This kit comprises a panel for the window opening apertured to clear said array and a protective cover that can be locked to the panel to prevent unauthorized access to the array.

16 Claims, 14 Drawing Figures

PATENTED FEB 11 1975 3,866,000

SHEET 2 OF 2

TELEPHONE LOCK KIT

BACKGROUND OF THE INVENTION

The invention relates to an automatic telephone that incorporates a number mechanism having an exposed array of manually operable number elements. The array of manually operable number elements may comprise a dial capable of oscillation with numbered finger holes in the dial or the array may comprise a plurality of numbered push buttons.

If such a telephone is not under constant supervision, unauthorized use of the telephone can be costly to the subscriber and can burden the telephone company with unnecessary disputes. Accordingly, there is need for some convenient provision to lock up the telephone against unauthorized outgoing calls without preventing incoming calls.

SUMMARY OF THE INVENTION

The invention comprises a simple kit that may be quickly and conveniently adapted to an automatic telephone to afford protection, whenever desired, against unauthorized use of the telephone. For the purpose of illustration and to teach the principles involved, the embodiments described herein are designed for use with an automatic telephone of the push button type, but it will be readily apparent to those skilled in the art that within the scope of the appended claims the invention may be readily adapted to an automatic telephone of the oscillatory dial type.

A push button telephone of the type to which the invention pertains incorporates a casing enclosing a number mechanism which includes an exposed array of numbered manually operable push-button elements. The number mechanism is enclosed by a housing which has a window opening for exposure of and access to the push button array. The push button array defines an area that is substantially smaller than the area defined by the casing of the number mechanism and the window opening in the housing is substantially larger in area than the push button array to make the push button array and parts adjacent thereto freely accessible through the window opening. The telephone structure further includes a panel for the window opening of the housing which panel has apertures to clear the respective push buttons. This panel is latched to the housing by means engaging opposite edges of the panel so that the panel may be removed when desired for inspection or repair of components inside the housing. The casing enclosing the number mechanism is mounted on a bottom plate of the housing which may be removed if extensive repair or replacement is required.

The kit provided by the present invention comprises two separate parts, namely, a panel of the same general character as the above described panel and a separate protective cover that may be engaged with the panel of the kit and locked thereto whenever it is desired to cover the push button array and thus make the push button array inaccessible for unauthorized use.

In the first practice of the invention disclosed herein, the panel of the kit replaces the original panel of the telephone and may be releasably engaged with the telephone housing by the same latch mechanism that retains the original panel. The substitute panel provided by the kit differs from the original panel in being adapted for releasable engagement by the protective cover of the kit.

Since the substituted panel is latched to the telephone housing solely at its opposite edges, there may be a possibility that when the protective cover is locked to the panel, an unauthorized person may simply unlatch the panel and remove the panel along with the protective cover to make the push button array accessible for manipulation. The invention teaches that this possibility may be eliminated by additionally anchoring the panel to the telephone housing by releasable means that lies wholly within the area defined by the protective cover. In such an arrangement the protective cover not only makes the push button array inaccessible, but also makes inaccessible the additional means that is provided to anchor the panel to the telephone housing.

In a second practice of the invention disclosed herein, the panel of the kit is adapted to be attached to the original panel of the telephone and is simply superimposed on the original panel. For this purpose the panel of the kit may be provided with suitable adhesive for bonding it permanently to the original panel of the telephone.

The features and advantages of the invention may be understood from the following detailed description and the accompanying drawings.

BRIEF DESCRIPTION OF THE DRAWINGS

In the drawings, which are to be regarded as merely illustrative.

DESCRIPTION OF THE SELECTED EMBODIMENTS OF THE INVENTION

Figure 1:
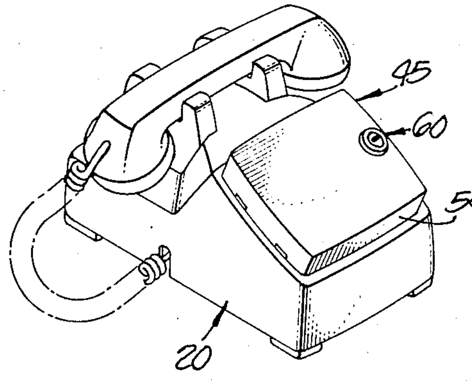
FIG. 1 is a perspective view of a telephone equipped with the first embodiment of the invention.
Figures 2, 3:
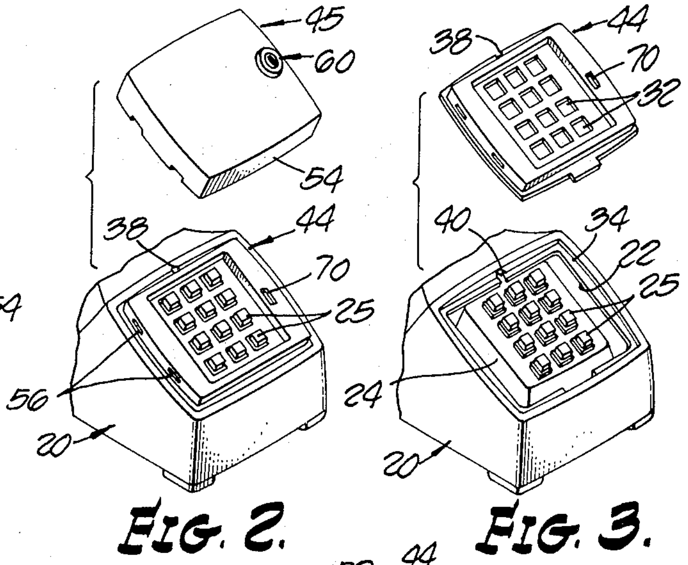
FIG. 2 is an exploded perspective view showing the protective cover separated from the apertured panel.
FIG. 3 is a similar exploded view showing the apertured panel separated from the telephone housing.

Referring to FIGS. 1–3 a conventional automatic telephone of the push button type has a housing, generally designated 20 which, as shown in FIG. 3, has a large generally rectangular window opening 22 on its upper side which permits a certain amount of access to an automatic number mechanism which is enclosed in a suitable casing 24 and which is capable of making connections with other telephones in response to selective manual actuation of an array of push buttons 25. The casing 24 of the number mechanism is mounted on a removable bottom plate (not shown) of the housing 20 to permit the casing to be removed bodily from the interior of the housing for full access to the number mechanism.

It can be seen in FIG. 3 that the area defined by the array of push buttons 25 is substantially smaller than the cross sectional area of the casing 24 and the upper side of the casing is substantially smaller in cross sectional area than the area of the window opening 22, the window opening permitting access to a substantial amount of space around the array of push buttons.

Figures 8, 9, 10, 11, 12, 13, 14:
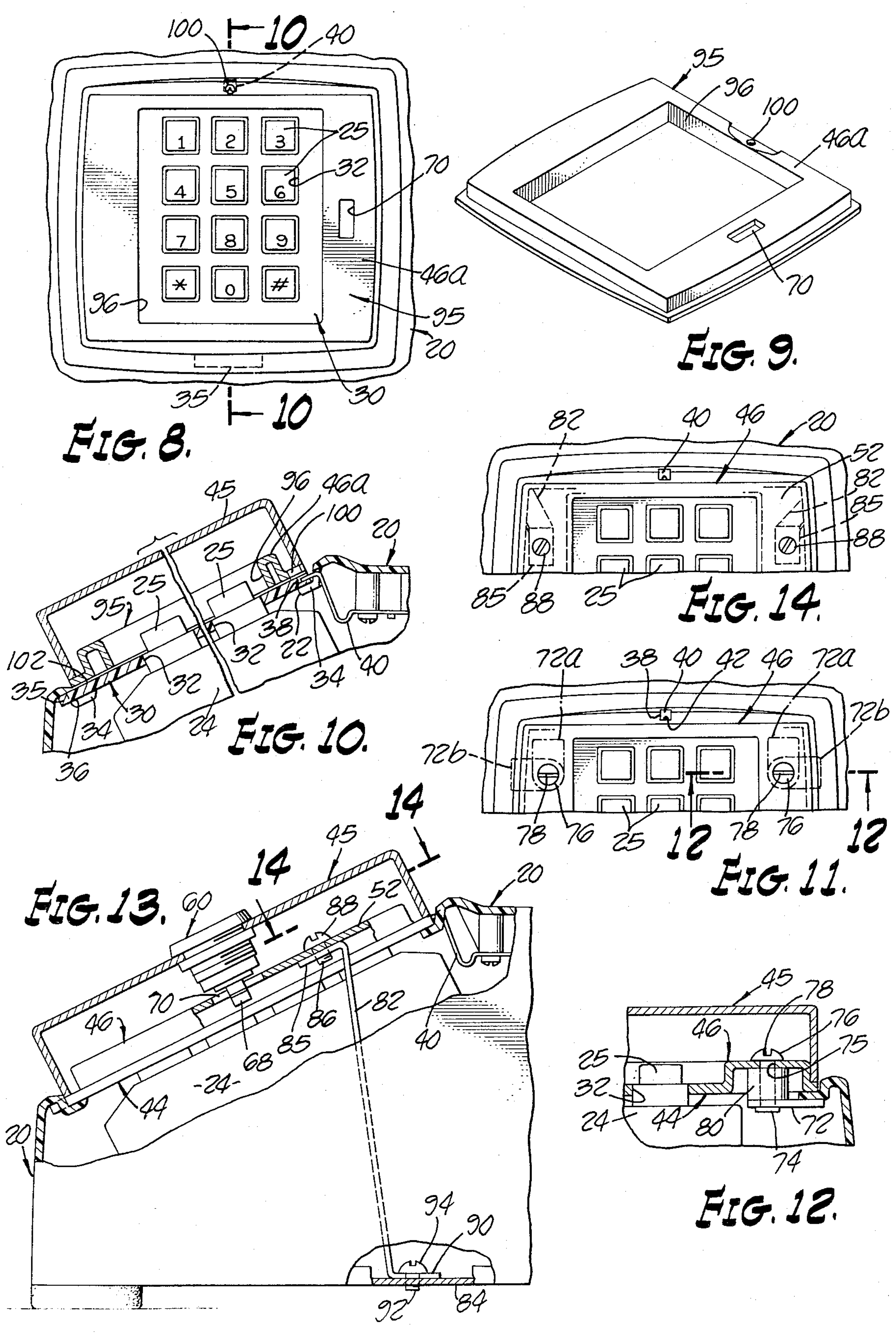
FIG. 8 is a fragmentary plan view of a second embodiment of the invention with the protective cover removed.
FIG. 9 is a perspective view of the apertured panel of the kit of the second embodiment of the invention.
FIG. 10 is a transverse section taken as indicated by the line 10—10 of FIG. 8 with the protective cover added to the view.
FIG. 11 is a fragmentary plan view of the first embodiment of the invention with the protective cover removed, the view showing how additional means may be added to the apertured panel to engage the telephone housing to prevent removal of the apertured panel when the protective cover is in position.
FIG. 12 is a fragmentary section taken along the line 12—12 of FIG. 11.
FIG. 13 is a vertical sectional view of the first embodiment of the invention showing how the apertured panel may be anchored to the removable bottom plate of the telephone housing.
FIG. 14 is a fragmentary plan view of the apertured panel as seen along the line 14—14 in FIG. 13.

A suitable panel for the window opening 22 is required to cover the space that surrounds the array of push buttons 25 with the panel suitably apertured to make the push buttons accessible and such a panel is part of the telephone as manufactured and supplied to the subscriber. The panel that is supplied with the telephone is not shown in FIGS. 1–7, but is shown and designated by numeral 30 in FIGS. 8 and 10. Referring to FIGS. 8 and 10, the original panel 30 of the telephone is a simple flat plate having a set of apertures 32 through which the push buttons 25 protrude for access by the user. The panel 30 rests on an inwardly offset portion 34 of the rim of the window opening and is suitably latched by releasable means. Typically, one of the four edges of the panel 30 is formed with a pair of spaced extensions or tongues 35 that seat in corresponding slots 36 in the rim of the window opening. The opposite side edge of the panel 30 is formed with a peripheral recess 38 to receive the bent end of a leaf spring 40 that functions as a retractable latch. The peripheral recess 38 is open from above to permit a pointed tool to be manipulated for retraction of the leaf spring 40 and to facilitate this operation the leading edge of the leaf spring is conventionally formed with a notch 42 as indicated in FIG. 11.

The structure described to this point is typical of a conventional automatic push button telephone and is not part of the present invention.

In the first embodiment of the invention shown in FIGS. 1–7, the above described original panel 30 is removed from the telephone and discarded. The kit that comprises this first embodiment of the invention consists of a substitute panel and a removable protective cover that may be releasably locked to the substitute panel. The substitute panel of the kit is generally designated by numeral 44 in FIGS. 2–7 and the protective cover is generally designated 45 in FIGS. 1, 2 and 4–7.

Like the original panel 30 the panel 44 of the present kit rests at its periphery on inwardly offset portions 34 of the rim of the window opening 22 with two spaced tongues 35 on one side edge of the panel seated in corresponding slots 36 in the rim of the window opening. The opposite side edge of the panel 44 is provided with the usual peripheral recess 38 to receive the leaf spring latch 40 of the telephone. It is apparent that it is a simple matter to remove and discard the original panel 30 and to substitute the panel 44 of the kit provided by the first embodiment of the invention.

Figures 4, 5, 7:
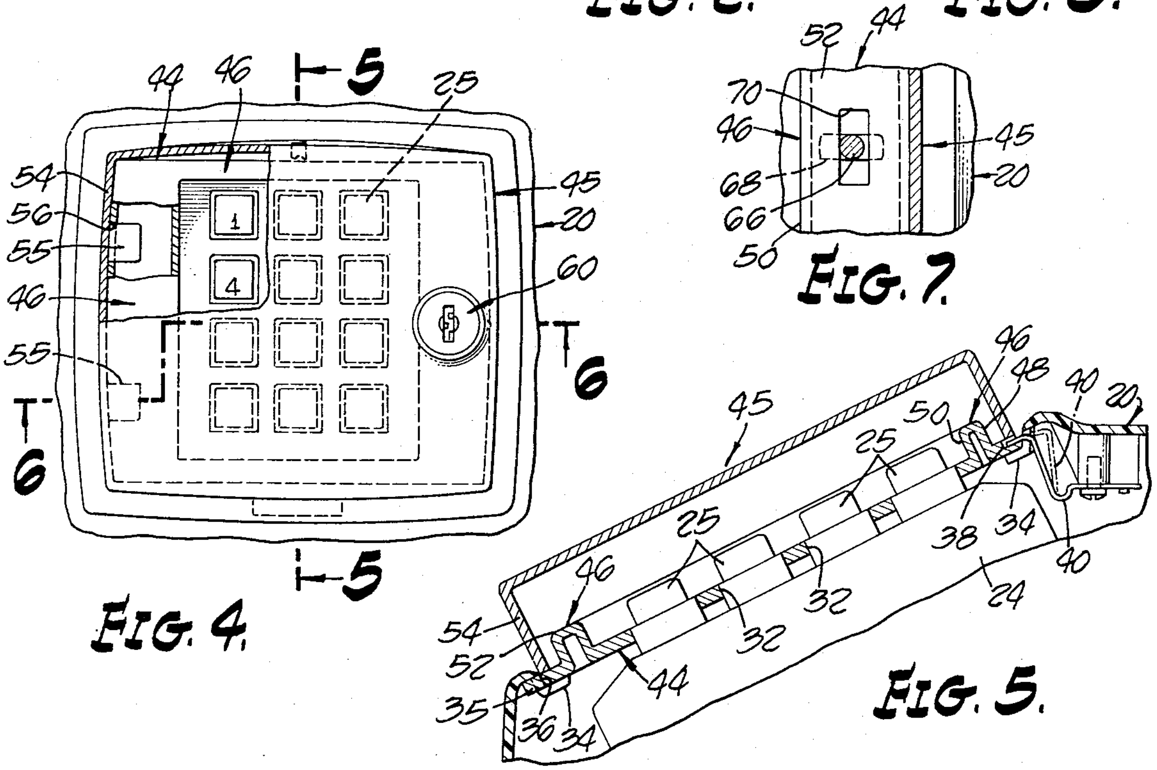
FIG. 4 is a fragmentary plan view of the first embodiment of the invention with the protective cover partially broken away to reveal the apertured panel thereunder.
FIG. 5 is a transverse section taken as indicated on the line 5—5 of FIG. 4.
FIG. 7 is an enlarged fragmentary plan view of a portion of the apertured panel of the kit showing a rectangular opening therein to receive means for locking the protective cover to the apertured panel.

The panel 44 of the kit has the usual apertures 32 through which the push buttons 25 protrude. The panel 44 differs, however, from the original panel 30 in being formed with a continuous upwardly offset rib, generally designated 46, which extends around the periphery of the panel and is shown in cross section in FIGS. 5 and 6. The rib 46 is relatively narrow on two opposite sides of the panel 44 as shown in FIG. 5 and is substantially wider on the other two opposite sides as may be seen in FIG. 6. The rib 46 has an outer side wall 48 and an inner side wall 50, these two side walls being interconnected by an upper web 52.

The protective cover 45 may be releasably engageable with the panel 44 in various ways in various practices of the invention. In this instance the protective cover 45 has a downwardly extending flange 54 that is continuous around its four sides and along one of the four sides the flange 54 is formed with a pair of spaced inwardly extending tongues 55 (FIGS. 4 and 6) that removably extend into corresponding recesses in the form of slots 56 in a widened portion of the rib 46 of the panel 44.

Figure 6:
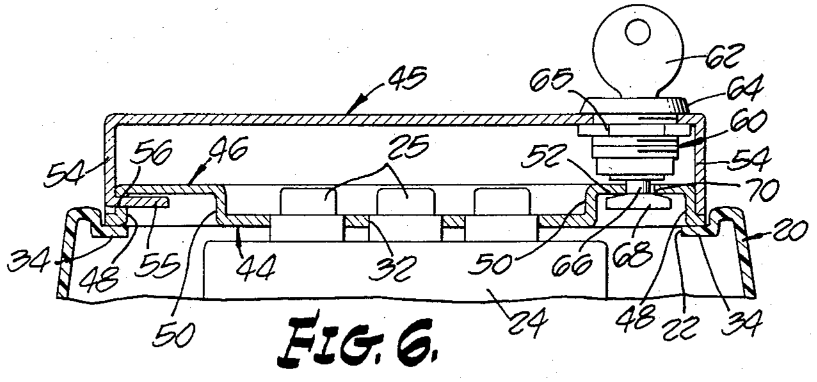
FIG. 6 is a transverse section taken as indicated by the angular line 6—6 of FIG. 4.

On the side opposite from the tongues 55, the protective cover 45 is provided with a well known type of cylinder lock 60 that is operable by a key 62. As indicated in FIG. 6, the top wall of the protective cover 45 is apertured to receive the cylinder lock 60 and to secure the cylinder lock in place an upper circumferential flange 64 of the lock engages the outer surface of the protective cover while a lock nut 65 that is threaded onto the body of the lock engages the inner surface of the wall of the protective cover.

The cylinder lock 60 has a T-shaped coaxial shaft 66, the shaft being formed with a terminal laterally extending element 68, the plan configuration of which is indicated by dotted lines in FIG. 7. FIG. 7 also shows how the web 52 of the rib 46 is provided with a rectangular aperture 70 that is of the same configuration in plan as the transverse lock element 68, but is slightly larger in area to permit the lock element to be inserted therethrough. When the transverse lock element 68 is inserted through the aperture 70 into the interior of the widened rib 46, the transverse lock element is turned by means of the key 62 to the position that is shown in full lines in FIG. 6 and is shown in dotted lines in FIG. 7, the protective cover 45 being thereby effectively locked to the panel 44. It is to be noted that to free the two tongues 55 of the protective cover 45 from the panel 44, the protective cover must be shifted relative to the panel to the left as the protective cover is viewed in FIG. 6, but with the protective cover engaging the rib 46 on the opposite side of the panel and with the lock 60 preventing retraction of the protective cover from the rib, the protective cover is securely held in assembled position and can be released only by unlocking operation of the lock 60 by means of the key 62.

It can be seen in FIG. 5 that when the protective cover 45 is locked in place a small portion of the leaf spring latch 40 is exposed outside of the protective cover and it is conceivable that an unauthorized person would tamper with the leaf spring latch to release the panel 44 along with the cover 45, thereby to expose the push buttons 25.

FIGS. 11 and 12 show how the closure 30 of the kit may be provided with additional means to anchor the panel to the telephone housing with the additional attachment means accessible only within the area defined by the protective cover. The additional latch means comprises latch tabs 72 in the region of corners of the panel 44, each of which is rotatable from a release position indicated by dotted lines at 72*a* in FIG. 11 to a latching position which is indicated by dotted lines 72*b* in FIG. 11 and is shown in full lines in FIG. 12.

As shown in FIG. 12, each latch tab 72 is mounted radially of the lower end of a stub shaft 74 that extends through an aperture 75 in the widened rib 46 of the panel, the outer end of the stub shaft being formed with a head 76 that bears against the outer surface of the rib and is provided with a diametrical groove 78 for manual rotation by a screw driver. On the underside of the panel 44 a suitable collar 80 embraces the stub shaft 74 and bears against the inner surface of the panel. It is apparent that each of the latch tabs 72 may be rotated between its two positions by means of a screw driver but the grooves 78 in the heads 76 of the stub shafts are inaccessible when the protective cover 45 is in place.

FIGS. 13 and 14 illustrate an alternative arrangement that may be employed to anchor the panel 44 in a manner that prevents removal of the panel so long as the protective cover 45 is in place. In this alternate arrangement metal straps 82 adjacent corners of the panel 44 are employed to anchor the closure to the conventional removable bottom plate 84 of the telephone housing 20. Each of the straps has a bent upper end 85 attached to the web 52 of the rib 46 by means of a screw 86 that has a grooved head 88 exposed on the upper side of the panel. Each strap 82 has a bent lower end 90 that is attached to the removable bottom plate 84 by a screw 92 with the grooved head 94 of the screw on the inner side of the removable bottom plate.

A feature of this alternate arrangement shown in FIGS. 13 and 14 is that the straps 82 not only anchor the panel 44 in its assembled position, but also prevent removal of the bottom plate 84 and thus prevent withdrawal of the number mechanism casing 24 and the associated push buttons 25 through the bottom of the telephone housing 20. It is to be noted that the upper screws 86 are inaccessible when the protective cover 45 is locked in place and the lower screws 94 cannot be manually operated from the underside of the removable bottom plate 84.

In the second embodiment of the invention illustrated by FIGS. 8–10, a panel 95 of the kit which is shown in perspective in FIG. 9 is an auxiliary panel of the configuration of a rectangular frame that is adapted to be permanently united with the original panel 30 of the telephone. As may be seen in FIG. 10, the panel 95 of the kit is somewhat smaller in area than the original panel 30 of the telephone and as may be seen in FIG. 9 the panel 95 has a large rectangular opening 96 to clear the set of apertures 32 of the panel 30.

The panel 95 of the kit of the second embodiment is similar to the panel 44 of the first embodiment of the invention in that it is formed with a similar rib 46a that extends around the periphery of the panel. The protective cover 45 of the kit is mounted on the panel 95 in the same manner that the protective cover is mounted on the panel 44 of the first embodiment of the invention. Thus, the panel 95 has the usual two slots 36 (not shown) to receive the two inwardly extending tongues 55 (FIG. 4) of the protective cover and the panel has the usual aperture 70 (FIG. 7) for cooperation with the cylinder lock 60. It is to be noted in FIG. 10 that the panel 95 has a peripheral recess or notch 100 that registers with the peripheral recess 38 of the original panel 30 to permit access to the leaf spring latch 40 to permit removal when desired of the original panel 30 with the additional closure 95 attached thereto.

The panel 95 may be permanently united with the original panel 30 in various ways in various practices of the invention. In this instance the underside of the panel 95 is provided with a layer of adhesive 102 by means of which the panel 95 may be permanently bonded to the original panel 30. The adhesive 102 may be of a well known type of pressure-sensitive adhesive that is initially covered by a protective sheet (not shown) which protective sheet is removed in preparation for bonding the panel 95 in place.

It is apparent that the kit of this second embodiment of the invention is even easier to install on a telephone than the kit of the first embodiment. All that is necessary is to remove the protective sheet from the adhesive 102 and then press the panel 95 against the original panel 30, allowing some time for the adhesive coating to form a permanent bond.

My description in specific detail of the selected embodiments of the invention will suggest various changes, substitutions and other departures from my disclosure within the spirit and scope of the appended claims.

I claim

1. A kit for use with a telephone that has a casing enclosing a number mechanism including an array of manually operable number elements for manipulation by a user, the area defined by the array being smaller than the area defined by the casing that encloses the number mechanism, and a housing enclosing the casing of the number mechanism and having a window opening larger than the area defined by said array with the array exposed centrally of the window opening, said kit comprising:

a panel for mounting over said window opening, said panel being apertured for access to said array;

means for connecting the panel with the housing of the telephone at the window opening;

a protective cover for said array to prevent unauthorized access thereto; and means for releasably engaging the protective cover with said panel and for locking the protective cover to the panel.

2. A kit as set forth in claim 1 in which said panel has at least one recess in the region of one edge of the panel and a recess in the region of an opposite edge of the panel;

and in which the protective cover is equipped with means to releasably engage said recesses.

3. A kit as set forth in claim 2 in which the protective cover is shaped and dimensioned to releasably engage said recess or recesses in the region of said one edge of the panel and the protective cover is equipped with lock means to releasably engage said recess in the region of the opposite edge of the panel.

4. A kit as set forth in claim 2 in which the protective cover is shaped and dimensioned for lateral movement relative to the panel into and out of engagement with said recess or recesses in the region of said one edge;

and in which the means on the cover for engagement with the recess in the region of the other edge cooperates with the recess in the region of said other edge to prevent the lateral relative movement of the protective cover out of engagement with the recess or recesses in said region of said one edge of the panel.

5. A kit as set forth in claim 4 in which the panel has a wall portion adjacent said one edge of the panel, which wall portion is substantially perpendicular to the plane of the panel, in which said wall portion is formed with a recess that faces laterally outwardly of the panel;

in which the corresponding edge of the protective cover is formed with an inwardly extending tongue to engage said outwardly facing recess in response to lateral movement of the protective cover relative to the panel;

and in which said recess in the region of the opposite edge of the panel faces outwardly of the plane of the panel, whereby engagement of said engagement means on the cover with the recess in the region of the opposite edge of the panel prevents lateral movement of the protective cover relative to the panel that is required for release of the protective cover from the recess in the region of said one edge of the panel.

6. A kit as set forth in claim 4 in which said recess in the region of said other edge of the panel is a non-circular aperture;

in which said engagement means on the protective cover is rotatable relative to the cover and is shaped and dimensioned to enter the non-circular aperture and when entered is rotatable into positive engagement with the rim of the non-circular aperture;

and which includes means to lock the rotary engagement means against release rotation.

7. A kit as set forth in claim 4 in which the panel is formed with an outwardly projecting hollow rib in each of said opposite regions of the panel, said rib having a first side wall facing outwardly of the periphery of the panel and a second side wall facing inwardly of the periphery of the panel with a web of the panel interconnecting said two side walls;

in which said first side wall of the rib is apertured to form said recess or recesses in the region of said one side of the panel;

and in which said recess in the region of the opposite edge of the panel is an aperture in the web of the rib.

8. A kit as set forth in claim 1 in which in the telephone as manufactured the housing of the telephone is provided with an original panel releasably attached to the housing at said central opening with the original panel apertured for exposure of said array of number elements;

and in which the panel of the kit is shaped and dimensioned to replace said original panel to permit the original panel to be discarded.

9. A kit as set forth in claim 1 wherein in the telephone as manufactured the housing of the telephone is provided with an original panel releasably attached to the housing at said window opening, the original panel being apertured to clear said array of number elements;

in which the panel of the kit is shaped and dimensioned to be superimposed on the original panel of the telephone;

and in which the means for connecting the panel of the kit with the housing comprises means for permanently attaching the panel of the kit to the original panel of the telephone.

10. A kit as set forth in claim 9 in which the panel of the kit is in the form of a rectangular frame.

11. A kit as set forth in claim 9 in which the means for attaching the panel of the kit to the original panel of the telephone comprises adhesive means.

12. A kit as set forth in claim 1 which includes means on the panel of the kit within the area defined by the mounted cover anchoring the panel to the telephone housing to prevent removal of the panel when the protective cover is mounted thereon.

13. A kit as set forth in claim 12 in which the panel of the kit is shaped and dimensioned to rest on the rim of said window opening of the telephone housing;

and in which the means within the area of the mounted protective cover for connecting the panel to the telephone housing includes latch means rotatably mounted on the panel of the kit, said latch means being manually rotatable into engagement with the underside of the rim of said window opening of the telephone housing.

14. A kit as set forth in claim 13 in which said latch means is shaped and dimensioned for rotation by a tool such as a screw driver.

15. A kit as set forth in claim 12, in which the housing of the telephone has a removable bottom wall with the casing of the number mechanism mounted thereon;

and in which the means for anchoring the panel of the kit to the housing of the telephone to prevent removal of the panel when the cover is mounted thereon anchors the panel to said removable bottom wall of the telephone housing so that the anchoring means not only prevents removal of the panel when the protective cover is mounted thereon but also prevents removal of the bottom wall of the telephone housing.

16. A kit as set forth in claim 15 in which said anchoring means is attached to the panel by fastening means exposed on the outer face of the panel.

* * * * *